United States Patent

[11] 3,572,459

[72] Inventor Robert A. Nieminski
     Philadelphia, Pa.
[21] Appl. No. 808,525
[22] Filed Mar. 19, 1969
[45] Patented Mar. 30, 1971
[73] Assignee Eaton Yale & Towne Inc.
     Cleveland, Ohio

[54] VEHICLE STEERING MECHANISM
     12 Claims, 10 Drawing Figs.
[52] U.S. Cl. .................................................. 180/79.2,
                                                         280/96
[51] Int. Cl. ................................................. B62d 5/06
[50] Field of Search .......................................... 180/79.2;
                                                     280/91, 93, 96

[56] References Cited
     UNITED STATES PATENTS
     2,916,294  12/1959  Quayle .......................... 280/93

| | | | |
|---|---|---|---|
| 3,069,183 | 12/1962 | Williamson ................. | 280/93 |
| 3,087,564 | 4/1963 | Quayle ........................ | 180/79.2 |
| 3,239,025 | 3/1966 | Schreck ....................... | 280/93X |

*Primary Examiner*—Kenneth H. Betts
*Assistant Examiner*—John A. Pekar
*Attorney*—Yount, Flynn & Tarolli

ABSTRACT: A vehicle disclosed herein has an improved steering mechanism for effecting geometric steering of steer wheels of the vehicle. The steering mechanism includes a plurality of sets of pinion gears which are driven by rack gears. The rack gears are moved into and out of meshing engagement with the pinion gears to rotate the steer wheels through a steering angle in either one of two directions. When the vehicle is to be turned in its minimum turning radius, one of the steer wheels is turned through a steering angle of more than 90° while the other steer wheel is turned through a steering angle of less than 90°.

Patented March 30, 1971

INVENTOR.
ROBERT A. NIEMINSKI
BY
Yount, Flynn & Tarolli
ATTORNEYS

FIG. 5

INVENTOR.
ROBERT A. NIEMINSKI
BY
Yount, Flynn & Tarolli
ATTORNEYS

INVENTOR.
ROBERT A. NIEMINSKI
BY
Yount, Flynn & Tarolli
ATTORNEYS

VEHICLE STEERING MECHANISM

This invention relates generally to a vehicle and more particularly to an improved vehicle steering mechanism.

Industrial vehicles or trucks are commonly used to move heavy loads in warehousing operations. Many warehouses have narrow aisles and other tight quarters which require the truck to have a high degree of maneuverability. To meet these maneuverability and load carrying requirements, many lift trucks have dual drive and/or steer wheels. To minimize slipping of the steer wheels relative to a floor or other support surface, mechanisms have been provided to steer these wheels geometrically. While being generally satisfactory, these known geometric steering mechanism have utilized various linkage and gear arrangements which are relatively bulky and difficult to fit into the limited space available on an industrial truck. In addition, the linkage and gear arrangements of these known geometric steering mechanisms are operable to move the steer wheels through only a relatively limited steering angle and therefore restrict the maneuverability of the industrial truck.

Accordingly, it is an object of this invention to provide a vehicle having a new and improved steering mechanism which is reliable in operation and adapted to be readily fitted into a relatively limited space.

Another object of this invention is to provide a vehicle having a new and improved steering mechanism which enables the vehicle to turn in a relatively small turning radius to thereby enhance the maneuverability of the vehicle.

Another object of this invention is to provide a vehicle having a new and improved steering mechanism which is operable to rotate steer wheels of the vehicle through a steering angle of more than 90° from a straightforward or neutral position to thereby enable the vehicle to be turned in a relatively small turning radius.

Another object of this invention is to provide a vehicle having a new and improved steering mechanism including a plurality of sets of pinion gears and a plurality of linear rack gears for driving the sets of pinion gears to effect geometric steering of wheels of the vehicle.

Another object of this invention is to provide a vehicle having a new and improved steering mechanism in accordance with the next preceding paragraph wherein the wheels of the vehicle are steerable through 180° of movement to enable the vehicle to be turned in a relatively small turning radius.

Another object of this invention is to provide a vehicle having a new and improved steering mechanism which responds in a similar manner to either right or left turns with a minimum of steering error.

These and other objects and features of the invention will become more apparent upon a consideration of the following description taken in connection with the accompanying drawings wherein.

The present invention provides a compact vehicle steering mechanism which is operable to control a pair of steer wheels to turn the vehicle in a relatively small turning radius. When the vehicle is being turned to either the right or the left in a minimum turning radius, one of the steer wheels of the vehicle is displaced from a straightforward or neutral position by an angle of more than 90° while the other steer wheel is displaced from the neutral position by an angle of less than 90°. To provide for this displacement of the steer wheels, the steering mechanism includes a plurality of sets of pinion gears which are drivingly connected with the steer wheels and are rotated by translational movement of a plurality of linear, segmented rack gears.

Figures 1, 2:
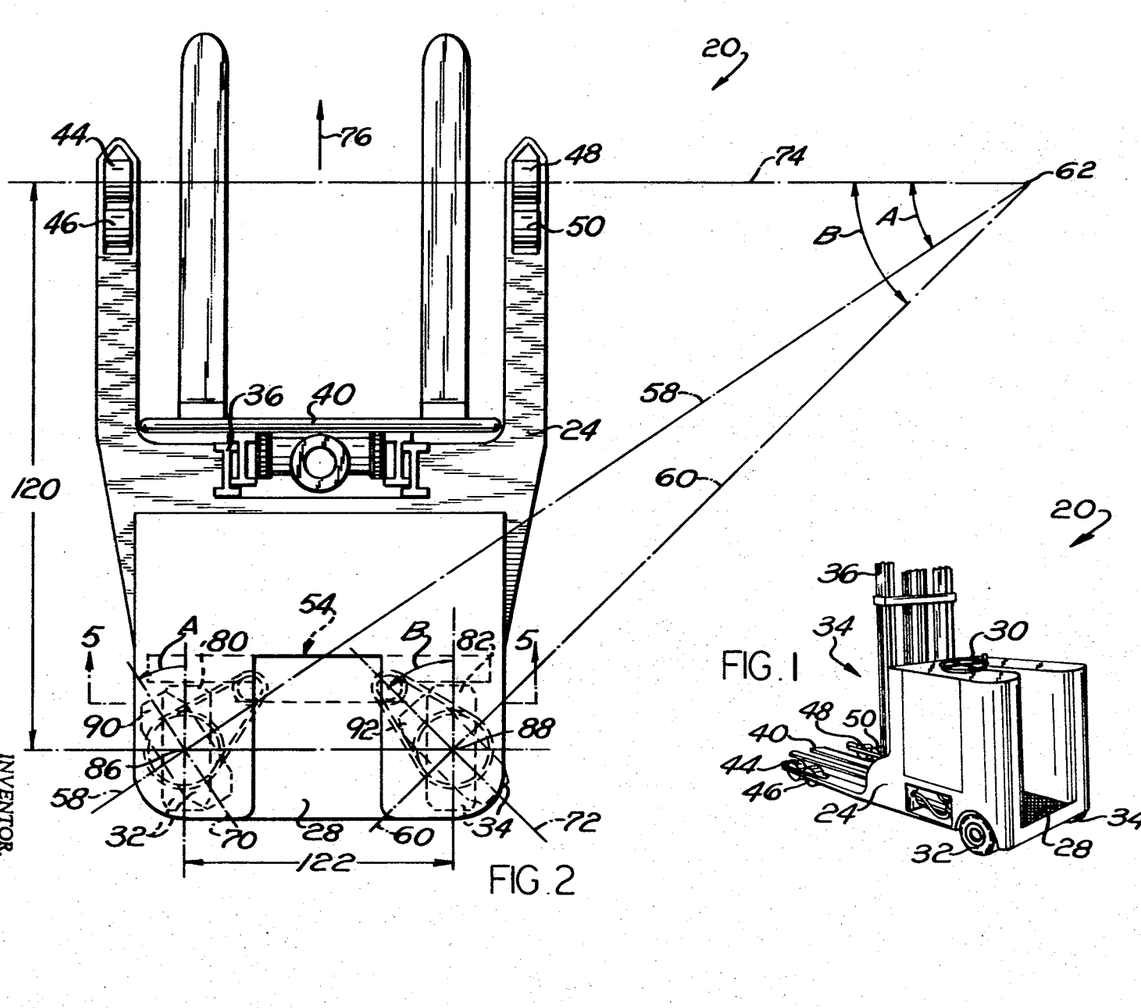
FIG. 1 is a schematic illustration of an industrial vehicle or lift truck constructed in accordance with the present invention.
FIG. 2 is a schematic top plan view of the industrial truck of FIG. 1, illustrating the manner in which the industrial truck makes a right-hand turn in a turning radius substantially greater than a minimum turning radius.

Although a steering mechanism constructed in accordance with the present invention can be utilized in many different types of vehicles, it is illustrated in FIG. 1 in association with an industrial vehicle or lift truck 20. Movement of the industrial truck 20 is controlled by an operator who rides on a platform 28 and manipulates a steering wheel 30 to turn steer wheels 32 and 34. The steer wheels 32 and 34 may function as drive wheels or other wheels may be provided to drive the truck 20 in a known manner. The industrial truck 20 includes a lift assembly 35 having a mast 36 connected to the frame 24 of the vehicle and along which a carriage assembly 40 is moved to raise and lower loads in a known manner. A plurality of load wheels 44, 46, 48 and 50 are provided at a forward end of the industrial truck 20 to assist in supporting loads carried by the truck.

The industrial truck 20 has a geometric steering mechanism 54 (FIGS. 2 and 5) which minimizes side slippage of the steer wheels 32 and 34 relative to a support surface or floor during a turning of the industrial truck 20. To minimize side slippage during turning, the steering mechanism 54 is operable to maintain the steer wheels 32 and 34 in such an angular relationship relative to each other that their main axes 58 and 60 intersect at a steer center 62 (FIG. 2) about which the truck 20 is turning. Since the main axes 58 and 60 of the steer wheels 32 and 34 intersect at the steer center 62, the tread axes 70 and 72 of the steer wheels 32 and 34 form tangents to the turning circles for the steer wheels. This tangential relationship enables the steer wheels 32 and 34 to roll along their respective turning circles with a minimum of side slippage.

The steering mechanism 54 also minimizes side slippage of the load wheels 44 and 48. To accomplish this, a fixed axis 74 about which the load wheels 44 and 48 rotate also extends through the steer center 62. During turns of different degrees of severity or sharpness, the steer center 62 is positioned at different points along the axis 74 to provide for the minimization of side slippage of the load wheels. The maintaining of steer wheels in an angular relationship relative to each other such that the axes of rotation of the wheels intersect at a steer center about which the vehicle is turning is well known to those skilled in the art and is commonly referred to as geometric steering.

When the industrial truck 20 is preceding in a straightforward direction, indicated by the arrow 76 in FIG. 2, the steer wheels 32 and 34 are each in neutral or straightforward positions indicated at 80 and 82 in FIG. 2. When the industrial truck 20 is to be turned toward the right, the steer wheels 32 and 34 are rotated about vertically extending steer axes 86 and 88 through respective steer angles A and B in response to rotation of the steering wheel 30. Of course, the greater the degree of severity or sharpness of the turn toward the right, the larger are the steer angles A and B. Since the right-hand steer wheel 34 is closest to the steer center 62, the steer angle B for the right-hand wheel 34 is larger than the steer angle A for the left-hand wheel 32. Continued movement of the industrial truck 20 in the forward direction with the steer wheels 32 and 34 in the turned positions indicated at 90 and 92 in FIG. 2 results in a right-hand turning of the industrial truck 20 about the steer center 62. When the turn has been completed, the steer wheels 32 and 34 are again returned to their neutral positions indicated at 80 and 82 of FIG. 2.

A left-hand turning of the industrial truck 20 is accomplished in a manner which is similar to, although opposite from, the manner in which a right-hand turn is accomplished. During a left turn, the steer center 62 is located along the axis 74 on the left-hand side of the industrial truck 20. The steer wheel 32 is rotated in a clockwise direction, as viewed in FIG. 2, through a relatively large steer angle while the right-hand steer wheel 34 is rotated in a clockwise direction through a relatively small steer angle. The horizontal main axes 58 and 60 intersect at the steer center 62 about which the truck 20 turns so that the read tread axes 70 and 72 are tangential to the turning circles for their respective steer wheels 32 and 34. Continued movement of the industrial truck 20 causes the vehicle to turn toward the left with a minimum of side slippage of the steer wheels 32 and 34 and the load wheels 44 and 48.

When the industrial truck 20 is being operated in certain situations, such as along a narrow aisle or in other tight quarters, it is frequently necessary to turn the industrial truck 20 sharply in a small turning radius. The industrial truck 20 is turned in a minimum turning radius when the steer center 62 is located on a forward extending centerline 98 of the truck (see FIG. 3). To minimize side slippage of the steer wheels 32 and 34 and load wheels 44 and 48, their main axes 58, 60 and 74 all intersect at the steer center 62 on the centerline 98 during a minimum radius turn.

Assuming that the industrial truck 20 is to be turned toward the right in its minimum turning radius, the right steer wheel 34 is rotated in a counterclockwise direction (as viewed in FIG. 3) about the steer axis 88. This rotation is continued until the wheel 34 has been turned through a steer angle B' which is greater than 90° so that the axis 60 about which the steer wheel 34 rotates intersects the centerline 98 at the steer center 62. Similarly, the left steer wheel 32 is rotated in a counterclockwise direction (as viewed in FIG. 3) about the steer axis 86 through a steer angle A' so that its main axis 58 also intersects the steer center 62.

Figures 3, 4:
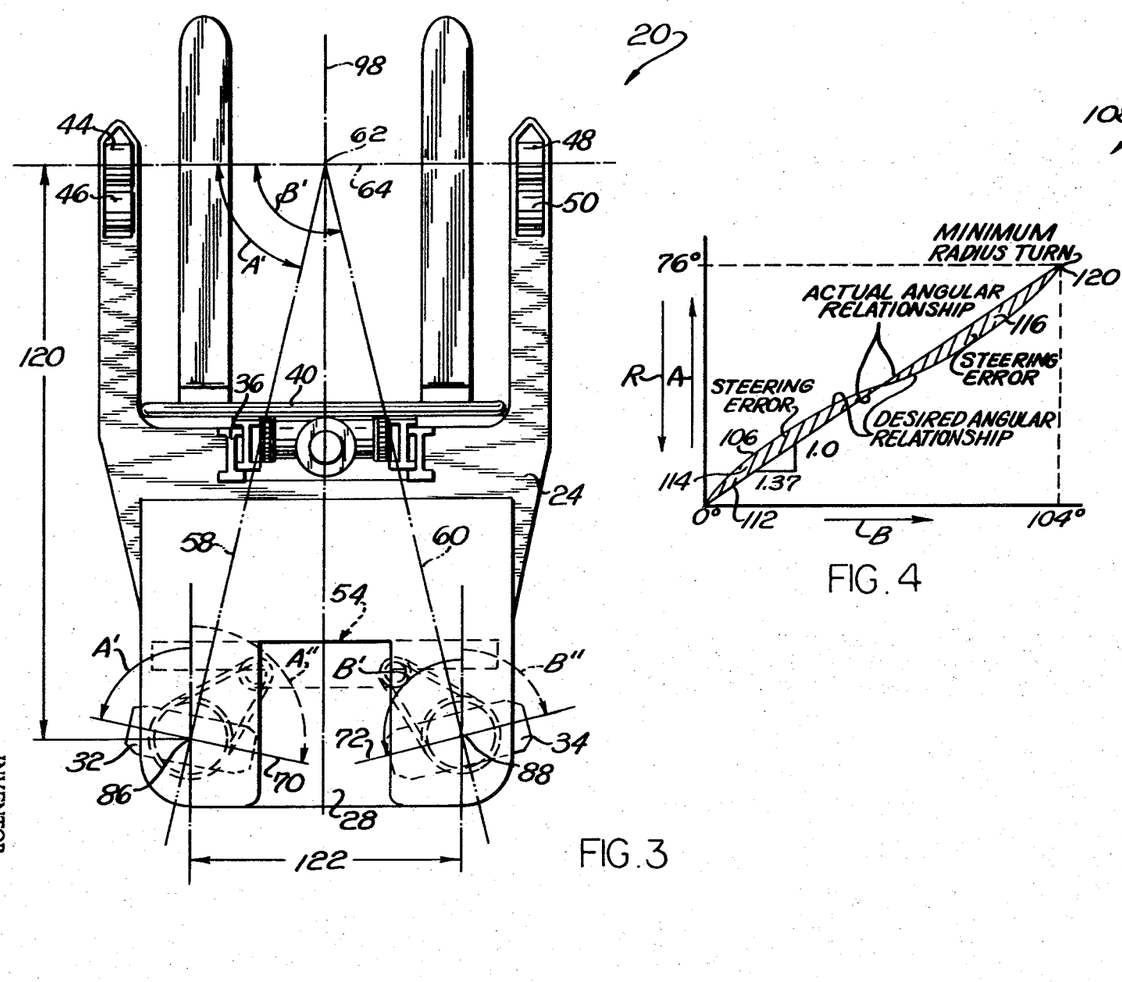
FIG. 3 is a schematic plan view, similar to FIG. 2, illustrating the manner in which the industrial truck makes a right-hand turn in a minimum turning radius.
FIG. 4 is a graph illustrating the angular relationship between steering wheels of the industrial truck during right-hand turns of various degrees of severity.

Continued forward movement of the industrial truck 20 then results in the truck turning toward the right in such a small radius that the truck tends to spin on the steer center 62. It should be noted that the steer angle A' is less than 90°. In fact, it can be geometrically established that the sum of the steer angles A' and B' is equal to 180°.

When the industrial truck 20 is to be turned to the left in its minimum turning radius, the steering wheels 32 and 34 are rotated in a generally clockwise direction (as viewed in FIG. 3) about their respective steer axes 86 and 88 through steering angles A'' and B'' indicated in dashed lines in FIG. 3. The main axes 58 and 60 then intersect each other and the axis 74 for the load wheels 44 and 48 on the centerline 98 of the industrial truck 20. Continued forward movement of the truck 20 results in the truck turning to the left in a minimum radius turn. It should be noted that the left steer wheel 32 was turned through the steer angle A'' which is greater than 90° while the right steer wheel 34 was turned through the steer angle B'' which is smaller than 90°.

For either a right or left minimum radius turn, the axes of rotation 58 and 60 of the steer wheels 32 and 34 intersect at the same point or steer center 62, that is at the intersection at the centerline 98 of the industrial truck 20 and the axis 74 of the load wheels 44 and 48. Therefore, the steer wheels 32 and 34 are located in the same angular relationship when the industrial truck 20 is to be turned in a minimum radius toward either the right or the left. To accomplish this, the steering mechanism 54 must be capable of rotating each of the steer wheels 32 and 34 through an angular distance of 180°. It should be noted that although the steer wheels 32 and 34 are in the same position for either a minimum radius right or a minimum radius left turn, the industrial truck 20 will turn in a direction corresponding to the direction in which the steer wheels were rotated to get to their minimum radius turn position.

To have true geometric steering during right-hand turns of different severity or sharpness, the steering angles A and B for the steer wheels 32 and 34 should be as indicated by the curving line 106 on the graph 108 of FIG. 4. However, the steering mechanism 54 has a linear output which is equal and opposite for right and left turns of the same degree of severity or sharpness. Therefore, the actual angular relationship of the steer wheels 32 and 34 to each other is illustrated by the straight line 112 in the graph 108. The shaded areas 114 and 116 between the straight line 112 and curved line 106 represent steering error.

It has been geometrically established that the maximum steering error increases as the ration of the wheelbase 120 (FIG. 3) to steer wheel spacing 122 decreases. However by selecting the gear ratio of the steering mechanism 54 properly, the steering error can be minimized for any given wheelbase 120 and steer wheel spacing 122. For example with a wheelbase to steer wheel spacing ratio of 2, the gear ratio of the steering mechanism 54 should be approximately 1.37 to 1.0 as shown by the slope of the line 112 in FIG. 4. The maximum steering error is then approximately 3½. This is less than 2° per steer wheel, and there is very little detrimental side slippage of the steer wheels 32 and 34 relative to their support surface upon a turning of the industrial truck 20. Of course, for vehicles having different wheelbase to steer wheel spacing ratios the gear ratio and maximum steering error will be different. There is substantially no steering error when the industrial truck 20 is being driven straight ahead, as shown by the intersection of the lines 106 and 112 at zero on the graph 108, and when the industrial truck is being turned in its minimum radius, as indicated by the intersection of the lines 112 and 106 at 120 in FIG. 4. The steering angle of the steer wheels 32 and 34 in a minimum radius turn varies with variations in the wheelbase to steer wheel spacing ratio. Most industrial trucks have a wheelbase to steering wheel spacing ratio which is greater than 1 and less than 4. The maximum steering angle for these trucks varies from approximately 97° for a wheelbase to steering wheel spacing ratio of 4 to approximately 116.5° for a wheelbase to steering wheel spacing ratio of 1.

For the particular wheelbase to steer wheel spacing ratio of 2, the steering angle A' of the left-hand steer wheel 32 in a minimum radius right-hand turn is equal to approximately 76°. The steering angle of B' for the right-hand steer wheel 34 in a minimum radius right-hand turn is equal to approximately 104°. It should be understood that the foregoing specific examples of steering errors, wheelbase to steer wheel ratio, and steering angles have been given for purposes for clarity of illustration and the invention is not to be limited to vehicles having any specific one of these characteristics. It should also be understood that a steering mechanism constructed in accordance with the present invention can be utilized in vehicles other than industrial trucks to provide a relatively high degree of maneuverability.

To enable the steer wheels 32 and 34 to be rotated to their minimum radius right and left turn positions, the steering mechanism 54 must be capable of rotating each of the steer wheels through a steering angle of more than 90° in one direction and through a total steering angle of at least 180°. To provide for this movement of the steer wheels 32 and 34, the steering mechanism 54 includes a pair of sets 130 and 132 of the pinion gears (FIG. 5) which are driven by a rack gear assembly 134 to operate associated chain drives 136 and 138 to rotate the steer wheels 32 and 34 about their respective steer axes 86 and 88. The set of pinion gears 130 includes an upper pinion gear 142 having a relatively small effective or pitch diameter and a lower pinion gear 144 having a relatively large effective or pitch diameter (see FIGS. 5 through 9). The pinion gears 142 and 144 are both fixedly mounted on a shaft 146 connected with a relatively small sprocket 150 of the chain drive 136 (see FIG. 6). The small sprocket 150 is in turn connected by a drive chain 152 to a large sprocket 154 fixedly mounted on a shaft 156 which is coaxial with the steer axis 86 for the steer wheel 32. The steer wheel 32 is rotatably mounted on the shaft 156 by a bracket 158.

Figure 5:
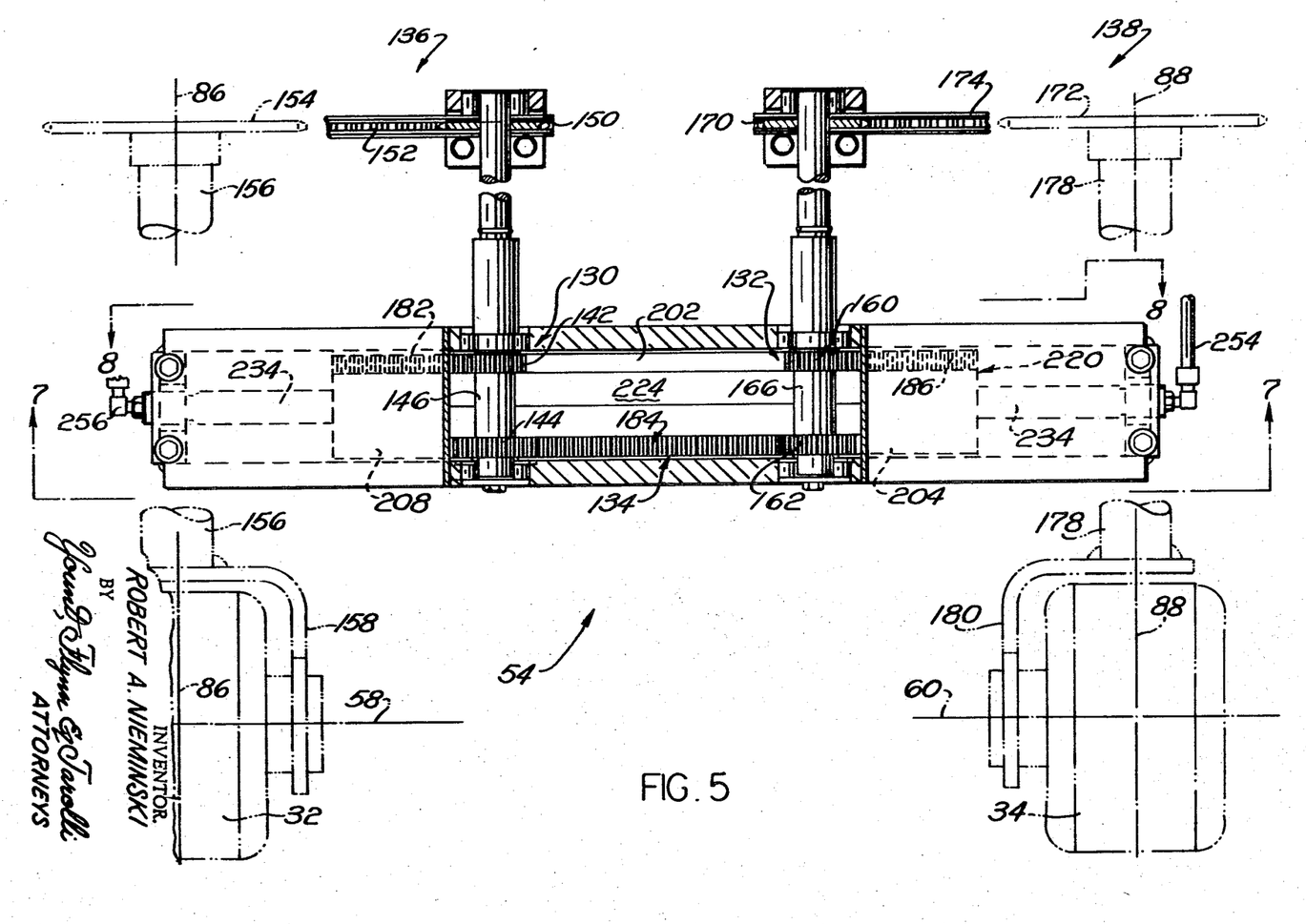
FIG. 5 is an enlarged sectional view, taken generally along the line 5—5 of FIG. 2, illustrating the structure of a steering mechanism for the industrial truck.
Figure 7:
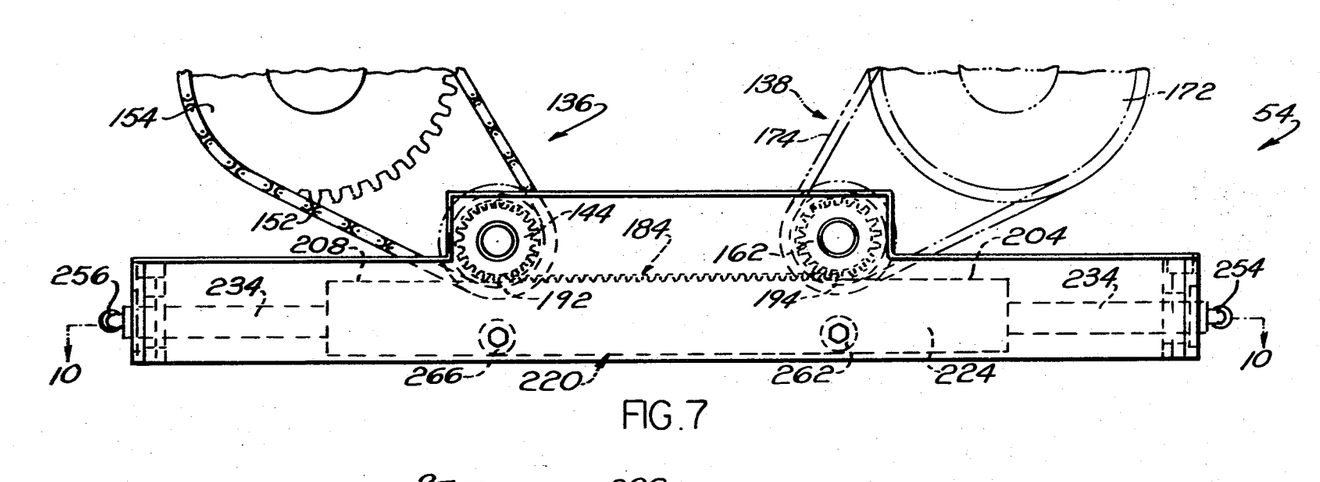
FIG. 7 is a bottom plan view, taken along the line 7—7 of FIG. 5, illustrating the relationship between rack and pinion gears of the steering mechanism.
Figure 8:
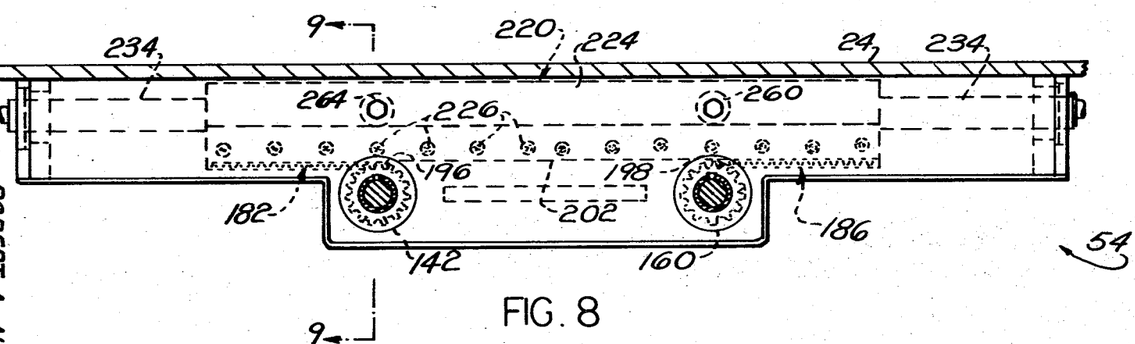
FIG. 8 is a top plan view, taken generally along the line 8—8 of FIG. 5, further illustrating the relationship of rack gears of the steering mechanism to pinion gears of the steering mechanism.

The pinion gear set 132 includes a pinion gear 160 having a relatively small effective diameter and a second pinion gear 162 having a relatively large effective or pitch diameter. The pinion gears 160 and 162 are both mounted on a common shaft 166 which is drivingly connected with a small sprocket 170 of the chain drive 138. The sprocket 170 is connected with a large sprocket 172 by a chain 174 (FIGS. 5 and 7). Rotation of the large sprocket 172 rotates the steer wheel 34 by means of a shaft 178 upon which the steer wheel 34 is rotatably mounted by a bracket 180. The shaft 178 is coaxial with the steer axis 88 for the steer wheel 34.

The rack gear assembly 134 is selectively operable to simultaneously drive the relatively large pinion gear of one of the sets 130 or 132 of pinion gears and the relatively small pinion gear of the other set of pinion gears. This results in one of the steer wheels 32 or 34 being rotated through a relatively large steer angle while the other steer wheel is being rotated through a relatively small steer angle. To provide for this driving of the pinion gears, the rack gear assembly 134 includes a plurality of linear rack gears 182, 184 and 186 which meshingly engage the pinion gears 142, 144, 160 and 162 respectively. Upon translational movement of the linear rack gears 182 through 186 relative to the pinion gears, one of the large pinion gears 144 or 162 is rotated by the rack gear 184. Simultaneously therewith one of the small pinion gears 142 or 160 is rotated by one of the rack gears 182 or 186. This rotation of the pinion gears rotates the steer wheels 32 and 34 about their steering axes 86 and 88 through the chain drives 136 and 138.

Figure 6:
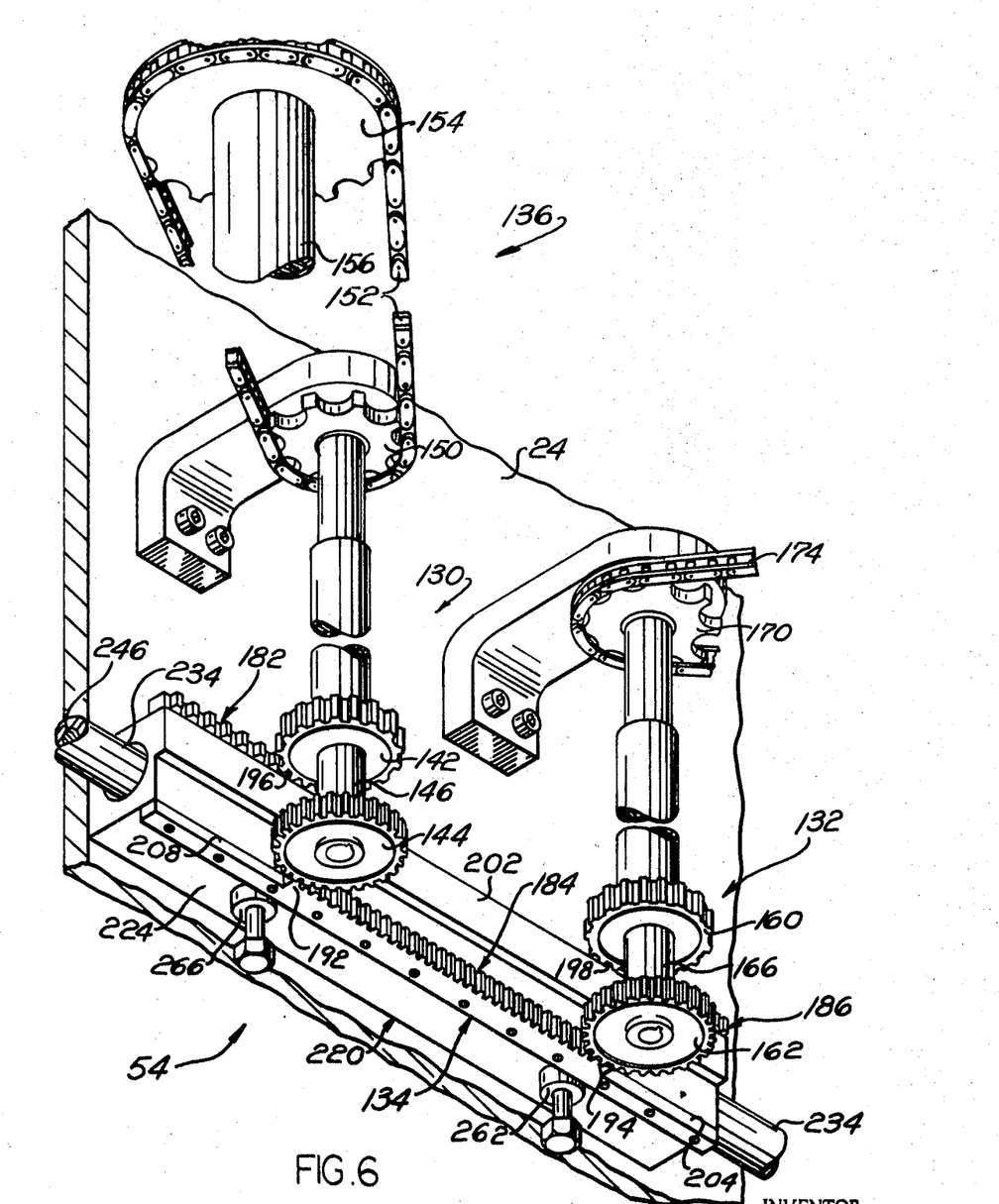
FIG. 6 is an enlarged partially broken away schematic pictorial illustration of the steering mechanism of FIG. 5.

When the steer wheels 32 and 34 are in their neutral positions (FIG. 5) and the industrial truck 20 is being driven straight ahead, the end teeth 192 and 194 on the rack gear 184 are positioned in meshing engagement with the two relatively large pinion gears 144 and 162 (see FIGS. 6 and 7). In addition, the end tooth 196 (FIGS. 6 and 8) on the rack gear 182 is in meshing engagement with the relatively small pinion gear 142. Similarly, the end tooth 198 on the rack gear 186 is in meshing engagement with the relatively small pinion gear 160. This meshing engagement between the rack gear assembly 134 and sets of pinion gears 130 and 132 retains the steer wheels 32 and 34 against undesired rotation while the industrial truck 20 is being driven in a straightforward direction.

Upon a turning of the industrial truck 20 to either the right or the left, the steer wheels 32 and 34 are rotated through steering angles A and B of different magnitudes by the steering mechanism 54 to provide for the previously described geometric steering of the industrial truck 20. Thus, upon a turning of the industrial truck 20 toward the right, the rack gear assembly 134 is shifted toward the left as viewed in FIGS. 5 and 6. This leftward movement of the rack gear assembly 134 results in the relatively small pinion gear 160 being driven by the rack gear 186 to rotate the steer wheel 34 through the relatively large steer angle B (see FIG. 2). In addition, the leftward movement (as viewed in FIG. 5) of the rack gear 184 rotates the relatively large pinion gear 144 to move the steer wheel 32 through the relatively small steer angle A. It should be noted that the leftward movement (as viewed in FIG. 5) of the rack gear assembly 134 moves the linear rack gears 184 and 182 out of meshing engagement with the pinion gears 162 and 142, respectively, so that blank or untoothed portions 202 and 204 of the rack gear assembly 134 are moved adjacent to the pinion gears 142 and 162.

Upon a turning of the industrial truck 20 toward the left, the rack gear assembly 134 is moved toward the right (as viewed in FIG. 5) to drive the pinion gear sets 130 and 132 and thereby effect rotation of the steer wheels 32 and 34 through the associated left steer angles. This rightward movement of the rack gear assembly 134 results in the relatively small pinion gear 142 being driven by the linear rack gear 182 to rotate the left steer wheel through a relatively large steering angle. Simultaneously therewith, the linear rack gear 184 rotates the relatively large pinion gear 162 to move the right steer wheel 34 through a relatively small steer angle. In addition, the rightward movement of the rack gear assembly 134 moves the linear rack gear 184 out of meshing engagement with the relatively large pinion gear 144 so that a blank or untoothed portion 208 of the rack gear assembly 134 is moved to a position adjacent the relatively large pinion gear 144 and the blank portion 202 is moved adjacent to the relatively small pinion gear 160. It should be noted that the end teeth 192, 194, 196 and 198 of the linear rack gears 182, 184 and 186 have been modified somewhat in shape to enable the rack gear assembly 134 to be moved relative to the sets of pinion gears 130 and 132 without interference or binding between the gears.

The angular relationship between the steering wheels 32 and 34 during a turn to either the right or the left is determined by the difference in the effective diameters between the large and small pinion gears 142, 144, 160 and 162 of the pinion gear sets 130 and 132. This is because one of the relatively small pinion gears 142 or 160 is driven by the rack gear assembly 134 to move one of the steering wheels 32 or 34 through a relatively large steering angle. Simultaneously therewith, the relatively large pinion gear 144 or 162 of the other set of pinion gears is driven by the rack gear assembly 134 to rotate the other steer wheel through a relatively small steer angle. If the industrial truck 20 has a particular wheelbase 120 to steer wheel spacing 122 (FIG. 2) ratio of 2, the relatively large pinion gears 144 and 162 are approximately 1.37 times as large as the relatively small pinion gears 142 and 160 to provide the angular relationship between the steer wheels 32 and 34 illustrated by the graph line 112 of FIG. 4. Of course, this ratio between the large and small gears will vary depending upon the wheelbase to steer wheel spacing ratio.

Although the rack gear assembly 134 can be moved relative to the sets of pinion gears 130 and 132 by many different types of drive assemblies, a hydraulic drive assembly 220 is advantageously used for effecting translational movement of the rack gear assembly relative to the sets of pinion gears. The drive assembly 220 (FIGS. 6 and 9) includes a housing 224 on which the rack gears 182, 184 and 186 are mounted by suitable fasteners 226. The housing 224 is slidable axially along a fixed piston 234 (FIGS. 9 and 10) under the influence of fluid pressure in expansible chambers 236 and 238 formed between a cylindrical wall 240 of the housing 224 and the fixed piston 234.

The housing 224 and the rack gears 182, 184 and 186 are shifted to the left (as viewed in FIG. 10) by supplying fluid under pressure to the chamber 236 while exhausting to the chamber 238 to a suitable reservoir. Similarly, the housing 224 and associated rack gears can be moved to the right as viewed in FIG. 10 by supplying fluid under pressure to the chamber 238 while exhausting the chamber 236 to the reservoir. To enable fluid to be conducted to the expansible chambers 236 and 238, a pair of axially extending fluid passages 244 and 246 are formed in the fixed piston 234 and are connected with the expansible chambers by cross or radial passages 248 and 250. The opposite ends of the passages 244 and 246 are connected by conduits 254 and 256 to a known valve assembly which is operable to control the flow of fluid to the conduits 254 and 256 in response to rotation of the steering wheel 30 of the industrial truck 20.

Figure 9:
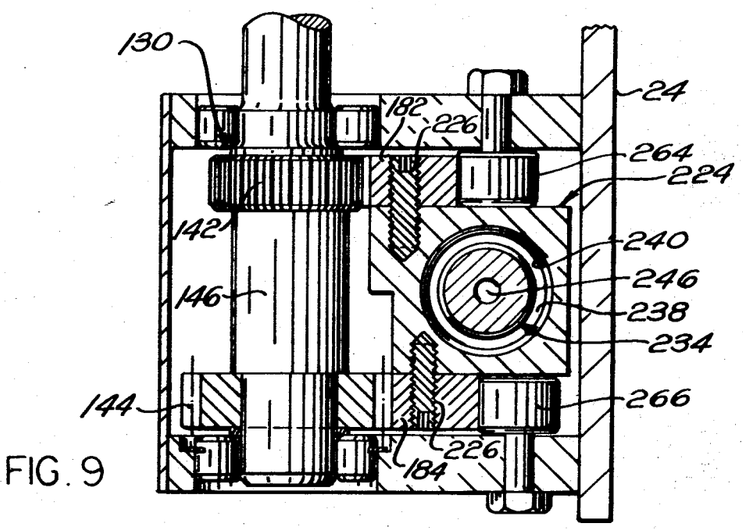
FIG. 9 is an enlarged sectional view, taken generally along the line 9—9 of FIG. 8, illustrating the relationship of a hydraulic drive assembly to the rack and pinion gears of the steering mechanism.
Figure 10:
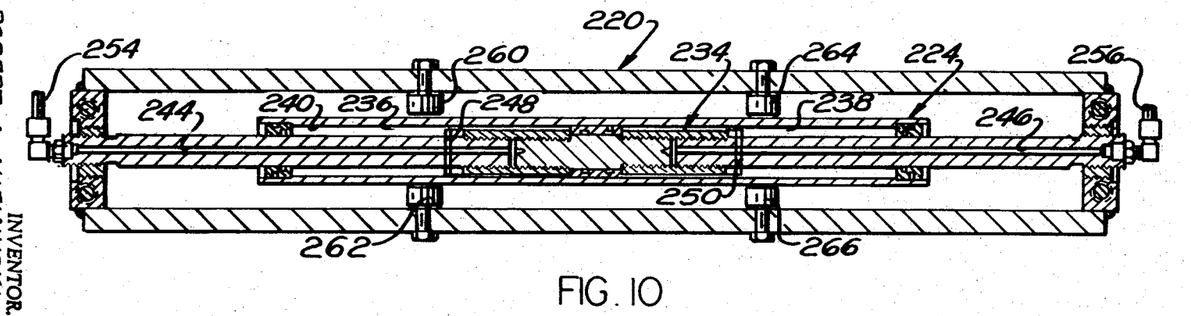
FIG. 10 is an enlarged sectional view, taken generally along the line 10—10 of FIG. 7, further illustrating the structure of the hydraulic drive assembly.

A plurality of guides and followers 260, 262, 264 and 266 (see FIGS. 7, 8, 9 and 10) engage the backsides of the rack gears 182, 184 and 186 in the manner illustrated in FIG. 9. The followers 260 through 266 resist reaction forces which tend to separate the pinion gear sets 130 and 132 from the rack gear assembly 134. In addition, the followers 260 and 266 guide the translational movement of the rack gear assembly 134 relative to the sets 130 and 132 of pinion gears.

In view of the foregoing description it can be seen that the steering mechanism 54 includes a plurality of sets 130 and 132 of pinion gears which cooperate with a rack gear assembly 134 to move the steer wheels 32 and 34 of the industrial truck 20 when it is to be turned. A hydraulic drive assembly 220 provided for effecting translational movement of the rack gear assembly 134. This translation of the rack gear assembly 134 causes one of the relatively small pinion gears 142 or 160 to rotate an associated one of the steer wheels 32 or 34 through a steer angle of more than 90° when the industrial truck 20 is to be turned in a minimum radius (see FIG. 3). Simultaneously with this rotational movement of one of the steer wheels 32 or 34 through a steering angle of more than 90°, the other steer wheel is moved through an angle of less than 90° by cooperation between one of the relatively large pinion gears 144 or 162 and the linear rack gear 184. The resulting angular relationship between the steer wheels 32 and 34 enables the industrial truck 20 to be turned in an extremely small minimum radius. Of course, the ability of the industrial truck 20 to be turned in an extremely small radius enhances the maneuverability of the industrial truck and enables it to be used in relatively narrow aisles and other tight quarters.

The steering mechanism 54 is relatively compact in size due, in part, to the use of the rack gear assembly 134 to drive the sets of pinion gears 130 and 132. Each of the pinion gears 142, 144, 160 and 162 can be rotated through a plurality of revolutions by a cooperating one of the rack gears 182, 184 and 186 to rotate the steer wheels 32 and 34 through the desired steering angle. This eliminates the necessity of using large diameter spur gears which take up a relatively large amount of space on the industrial truck 20. In addition, the gear ratio between the relatively small pinion gears 142 and 160 and relatively large pinion gears 144 and 162 can be varied to suit the particular wheelbase 120 and steer wheel spacing 122 of a given vehicle. This enables the steering mechanism 54 to be constructed with a gear ratio which provides steering characteristics which closely approximate the desired steering characteristics illustrated by the curved line 106 of the graph 108. In addition, the steering mechanism 54 can be bench assembled prior to being installed in a vehicle to enable the steering mechanism to be adjusted with a minimum of effort.

I claim:

1. In a vehicle, a pair of spaced-apart steer wheels mounted for rotation relative to each other and a steering mechanism operatively interconnecting said steer wheels for varying an angular relationship of said steer wheels upon a turning of said vehicle, said steering mechanism including first gear means operatively connected with one of said steer wheels for rotating said one steer wheel relative to the other steer wheel and second gear means operatively connected with said other steer wheel for rotating said other steer wheel relative to said one steer wheel, and first and second gear means each including first and second pinion gears one of which has a larger effective diameter than the other, first rack gear means for driving said first pinion gear of said first gear means to rotate said one steer wheel in a first direction at a first speed to provide for a turning of said vehicle in one direction, second rack gear means for driving said second pinion gear of said second gear means to rotate said other steer wheel in said first direction at a second speed different than said first speed to further provide for turning of said vehicle in said one direction and for driving said second pinion gear of said first gear means to rotate said one steer wheel in a second direction opposite from said first direction at a third speed to provide for a turning of said vehicle in another direction opposite from said one direction, third rack gear means for driving said first pinion gear of said second gear means to rotate said other steer wheel in said second direction at a fourth speed different from said third speed to further provide for turning of said vehicle in said other direction, and drive means for effecting translational movement of said rack gear means to drive said first and second gear means to turn said vehicle in either said one direction or said other direction.

2. A vehicle as set forth in claim 1 wherein said first rack gear means is in meshing engagement with said first pinion of said first gear means when said vehicle is turning in said one direction and is out of meshing engagement with said first pinion of said first gear means when said vehicle is turning in said other direction, said second rack gear means is in meshing engagement with said second pinion of said second gear means when said vehicle is turning in said one direction and is out of meshing engagement with said second pinion of said first gear means when said vehicle is turning in said one direction, said second rack gear means being in meshing engagement with said second pinion of said first gear means when said vehicle is turning in said other direction and being out of meshing engagement with said second pinion of said second gear means when said vehicle is turning in said other direction, said third rack gear means is in meshing engagement with said first pinion of said second gear means when said vehicle is turning in said other direction and is out of meshing engagement with said first pinion of said second gear means when said vehicle is turning in said one direction.

3. A vehicle as set forth in claim 1 wherein one of said rack gear means drives the pinion gear of said first gear means having the larger effective diameter and another of said rack gear means drives the pinion gear of said second gear means having the smaller effective diameter upon turning of said vehicle in said one direction and wherein one of said rack gear means drives the pinion gear of said first gear means having the smaller effective diameter and another of said rack gear means drives the pinion gear of said second gear means having the larger effective diameter upon turning of said vehicle in said other direction.

4. A vehicle as set forth in claim 1 wherein each of said first and second gear means further includes a rotatable shaft secured to said first and second pinions for rotation therewith and operatively connected to an associated one of said steer wheels, said steer wheels, said shafts of said first and second gear means being rotated through a plurality of revolutions under the influence of said rack gear means upon turning of said vehicle in either of said directions.

5. In a vehicle, first and second rotatable steer wheels and means for effecting substantially geometric steering of said steer wheels, said means including first and second sets of pinions each including a pair of pinion gears of different effective diameters operatively connected to said first and second steer wheels respectively, linear rack means for driving said sets of pinions to rotate said first steer wheel through a steering angle greater than 90° and said second steer wheel through a steering angle less than 90° to provide for a turning of said vehicle in its minimum turning radius in one direction and for driving said sets of pinions to rotate said first steer wheel through a steering angle of less than 90° and said second steer wheel through a steering angle greater than 90° to provide for a turning of said vehicle in its minimum turning radius in another direction.

6. In a vehicle as set forth in claim 5 wherein the pinion gear having the largest effective diameter is driven by said linear rack means to rotate the associated steer wheel through a steering angle of less than 90° to provide for a turning of the vehicle in its minimum turning radius in one direction and the pinion gear having the smallest effective diameter is driven by said linear rack means ro rotate the associated steer wheel through a steering angle of more than 90° to provide for a turning of the vehicle in its minimum turning radius in another direction.

7. A vehicle as set forth in claim 5 wherein said first and second sets of pinions each include a pair of pinion gears and said linear rack means includes a plurality of linear rack gears which are moved into and out of meshing engagement with the pinion gears of said first and second sets of pinions to thereby effect the aforesaid rotation of said steer wheels to provide for turning of said vehicle in its minimum turning radius in either of said directions.

8. A vehicle as set forth in claim 7 further including drive means connected to said linear rack means for effecting simultaneous translational movement of said plurality of rack gears upon a turning of said vehicle in either of said directions.

9. In a vehicle as set forth in claim 5 wherein a summation of the steering angles through which said first and second steer wheels are rotated upon a turning of said vehicle in its minimum turning radius in either of said directions is equal to 180°.

10. A vehicle as set forth in claim 5 wherein said first and second sets of pinions each include a pair of pinion gears, said linear rack means being in meshing engagement with one of the pinion gears of said first set of pinion gears and one of the pinion gears of said second set of pinion gears and out of meshing engagement with the other pinion gears of said first and second sets of pinions when said vehicle is turning in said one direction, said linear rack means being in meshing engagement with said other pinion gear of said first and second sets of pinion gears and out of meshing engagement with said one pinion gears of said first and second sets of pinions when said vehicle is turning in said other direction.

11. In a vehicle, a pair of spaced-apart steer wheels mounted for rotation relative to each other and a steering mechanism operatively interconnecting said steer wheels for varying an angular relationship of said steer wheels upon a turning of said vehicle, said steering mechanism including first gear means operatively connected with one of said steer wheels for rotating said one steer wheel relative to the other steer wheel and second gear means operatively connected with said other steer wheel for rotating said other steer wheel relative to said one steer wheel, said first and second gear means each including a first pinion gear having a relatively large effective diameter and a second pinion gear having a relatively small effective diameter, rack gear means for driving said first pinion gear of said first gear means to rotate said one steer wheel through a relatively large steer angle in a first direction and for driving said second pinion gear of said second gear means to rotate said other steer wheel through a relatively small steer angle in said first direction to provide for a turning of said vehicle in one direction, said rack gear means being operable to drive said second pinion gear of said first gear means to rotate said one steer wheel through a relatively small steer angle in a second direction opposite from said first direction and to drive said first pinion gear gear of said second gear means to rotate said other steer wheel through a relatively large steer angle in said second direction to provide for a turning of said vehicle in another direction opposite from said one direction.

12. In a vehicle as set forth in claim 11 wherein said rack gear means includes a plurality of linear rack gears for meshingly engaging and driving said pinion gears and base means for supporting said plurality of linear rack gears for simultaneous movement relative to said pinion gears in such a manner that some of said linear rack gears drive some of said pinion gears while other of said linear rack gears are moved out of meshing engagement with other of said pinion gears upon movement of aid base means, said steering mechanism including drive means for selectively moving said base means relative to said pinion gears.